United States Patent
Coleman et al.

(10) Patent No.: US 11,601,467 B2
(45) Date of Patent: Mar. 7, 2023

(54) SERVICE PROVIDER ADVANCED THREAT PROTECTION

(71) Applicant: L3 Technologies, Inc., New York, NY (US)

(72) Inventors: Glenn Coleman, Berwyn, PA (US); Peter Martz, Marlton, NJ (US); Kenneth Moritz, Lansdowne, PA (US)

(73) Assignee: L3 Technologies, Inc., New York, NY (US)

( * ) Notice: Subject to any disclaimer, the term of this patent is extended or adjusted under 35 U.S.C. 154(b) by 158 days.

(21) Appl. No.: 16/109,275

(22) Filed: Aug. 22, 2018

(65) Prior Publication Data

US 2019/0068617 A1 Feb. 28, 2019

Related U.S. Application Data

(60) Provisional application No. 62/549,693, filed on Aug. 24, 2017.

(51) Int. Cl.
*H04L 9/40* (2022.01)
*G06F 21/53* (2013.01)

(52) U.S. Cl.
CPC ............ *H04L 63/145* (2013.01); *G06F 21/53* (2013.01); *H04L 63/029* (2013.01);
(Continued)

(58) Field of Classification Search
CPC . H04L 63/145; H04L 63/0281; H04L 63/029; H04L 63/0876; H04L 63/20; G06F 21/53; G06F 21/51; G06F 2221/034
See application file for complete search history.

(56) References Cited

U.S. PATENT DOCUMENTS

| 7,150,040 B2 | 12/2006 | Brownell |
| 7,467,408 B1 | 12/2008 | O'Toole, Jr. |

(Continued)

FOREIGN PATENT DOCUMENTS

RU 2406138 C1 12/2010

OTHER PUBLICATIONS

Barnet, Mark, "Praktikum Po Zaschite Seti Kompanii", Windows IT Pro/RE, Nov.-Dec. 2006, 4 pages.
(Continued)

*Primary Examiner* — Ali S Abyaneh
(74) *Attorney, Agent, or Firm* — Condo Roccia Koptiw LLP (57) ABSTRACT

Methods and systems are disclosed for service provider based advanced threat protection. A service provider network may include one or more network devices. The service provider network may be configured to determine network isolation configuration information for a client device, on a local area network (LAN), associated with a client account. The network isolation configuration information may include an identification of trusted network destination and/or untrusted network destinations for the client device. The service provider network may send the network isolation configuration information to the client device. The service provider network may be configured to authenticate a segregated memory space operating on the client device. The service provider network may be configured to allow, based on the network isolation configuration information and on the authentication of the segregated memory space, an application or process operating in the authenticated segregated memory space to communicate with an untrusted network destination.

18 Claims, 2 Drawing Sheets

(52) U.S. Cl.
CPC ...... *H04L 63/0281* (2013.01); *H04L 63/0876* (2013.01); *H04L 63/20* (2013.01); *G06F 2221/034* (2013.01)

(56) References Cited

U.S. PATENT DOCUMENTS

| | | | |
|---|---|---|---|
| 7,478,330 B1 | 1/2009 | Branson et al. |
| 7,694,328 B2 | 4/2010 | Joshi et al. |
| 7,698,442 B1 | 4/2010 | Krishnamurthy et al. |
| 7,716,720 B1 | 5/2010 | Marek et al. |
| 7,805,516 B2 | 9/2010 | Kettler et al. |
| 7,870,153 B2 | 1/2011 | Croft et al. |
| 7,926,086 B1 | 4/2011 | Violleau et al. |
| 7,954,150 B2 | 5/2011 | Croft et al. |
| 7,970,923 B2 | 6/2011 | Pedersen et al. |
| 8,090,797 B2 | 1/2012 | Chinta et al. |
| 8,539,561 B2 | 9/2013 | Gupta et al. |
| 8,566,398 B2 | 10/2013 | Barnier et al. |
| 8,613,070 B1 | 12/2013 | Borzycki et al. |
| 8,769,268 B2 | 7/2014 | Morozov et al. |
| 8,832,833 B2 | 9/2014 | Demopoulos et al. |
| 8,931,054 B2 | 1/2015 | Huynh et al. |
| 8,966,464 B1 | 2/2015 | Christopher et al. |
| 9,294,492 B1 | 3/2016 | Martini et al. |
| 9,386,021 B1 | 7/2016 | Pratt |
| 9,438,634 B1 | 9/2016 | Ross et al. |
| 9,465,734 B1 | 10/2016 | Myrick et al. |
| 9,531,715 B1 | 12/2016 | Rodgers et al. |
| 9,560,081 B1 | 1/2017 | Woolward |
| 9,602,524 B2 | 3/2017 | Ghosh et al. |
| 9,609,026 B2 | 3/2017 | Ross et al. |
| 9,680,873 B1 | 6/2017 | Halls et al. |
| 9,729,579 B1* | 8/2017 | Marino .................. H04L 63/123 |
| 9,787,639 B1 | 10/2017 | Sun et al. |
| 9,864,600 B2 | 1/2018 | Larimore et al. |
| 9,921,860 B1 | 3/2018 | Banga et al. |
| 9,942,198 B2 | 4/2018 | Hoy et al. |
| 10,037,199 B2 | 7/2018 | Hung et al. |
| 10,055,231 B1 | 8/2018 | Li et al. |
| 10,104,120 B2 | 10/2018 | Gopalakrishna |
| 10,122,703 B2 | 11/2018 | Innes et al. |
| 10,375,111 B2* | 8/2019 | Schultz .................... G06F 21/53 |
| 10,397,273 B1 | 8/2019 | Stickle et al. |
| 10,521,612 B2 | 12/2019 | Arad et al. |
| 10,554,475 B2 | 2/2020 | Weinstein et al. |
| 10,558,798 B2 | 2/2020 | Weinstein et al. |
| 10,873,589 B2 | 12/2020 | Cheetancheri et al. |
| 10,931,669 B2 | 2/2021 | Coleman et al. |
| 2002/0023212 A1 | 2/2002 | Proudler |
| 2002/0040439 A1 | 4/2002 | Kellum |
| 2002/0069366 A1 | 6/2002 | Schoettger |
| 2002/0069369 A1 | 6/2002 | Tremain et al. |
| 2004/0249938 A1 | 12/2004 | Bunch |
| 2005/0144467 A1 | 6/2005 | Yamazaki |
| 2006/0070066 A1 | 3/2006 | Grobman |
| 2006/0282795 A1 | 12/2006 | Clark et al. |
| 2007/0136579 A1 | 6/2007 | Levy et al. |
| 2007/0220187 A1 | 9/2007 | Kates |
| 2007/0260873 A1 | 11/2007 | Hatfalvi et al. |
| 2008/0016313 A1 | 1/2008 | Murotake et al. |
| 2008/0028401 A1 | 1/2008 | Geisinger |
| 2008/0201711 A1 | 8/2008 | Amir Husain |
| 2008/0256536 A1 | 10/2008 | Zhao et al. |
| 2009/0055924 A1 | 2/2009 | Trotter |
| 2009/0164994 A1 | 6/2009 | Vasilevsky et al. |
| 2009/0172781 A1 | 7/2009 | Masuoka et al. |
| 2009/0249472 A1 | 10/2009 | Litvin et al. |
| 2009/0265760 A1 | 10/2009 | Zhu et al. |
| 2009/0328038 A1 | 12/2009 | Yamada et al. |
| 2010/0138829 A1 | 6/2010 | Hanquez et al. |
| 2010/0138830 A1 | 6/2010 | Astete et al. |
| 2010/0217916 A1 | 8/2010 | Gao et al. |
| 2010/0223613 A1 | 9/2010 | Schneider |
| 2010/0251329 A1 | 9/2010 | Wei |
| 2011/0154431 A1 | 6/2011 | Walsh |
| 2011/0299515 A1 | 12/2011 | Robertson et al. |
| 2012/0017213 A1 | 1/2012 | Hunt et al. |
| 2012/0023593 A1 | 1/2012 | Puder et al. |
| 2012/0054744 A1 | 3/2012 | Singh et al. |
| 2012/0265976 A1 | 10/2012 | Spiers et al. |
| 2012/0266149 A1 | 10/2012 | Lebert |
| 2013/0132948 A1 | 5/2013 | Hari et al. |
| 2013/0145463 A1 | 6/2013 | Ghosh et al. |
| 2013/0318594 A1* | 11/2013 | Hoy ...................... G06F 9/45558 726/15 |
| 2014/0040979 A1 | 2/2014 | Barton et al. |
| 2014/0059642 A1 | 2/2014 | Deasy et al. |
| 2014/0075535 A1 | 3/2014 | Soffer et al. |
| 2014/0108558 A1 | 4/2014 | Borzycki et al. |
| 2014/0115646 A1 | 4/2014 | Rajgopal et al. |
| 2014/0215621 A1 | 7/2014 | Xaypanya et al. |
| 2014/0282890 A1* | 9/2014 | Li ........................... G06F 21/51 726/4 |
| 2014/0310810 A1* | 10/2014 | Brueckner .......... G06F 9/45533 726/23 |
| 2014/0344912 A1 | 11/2014 | Chapman et al. |
| 2014/0351516 A1 | 11/2014 | Larimore et al. |
| 2014/0380403 A1 | 12/2014 | Pearson et al. |
| 2014/0380412 A1 | 12/2014 | Fitzgerald et al. |
| 2015/0058923 A1 | 2/2015 | Rajagopal et al. |
| 2015/0106822 A1 | 4/2015 | Lei |
| 2015/0143374 A1 | 5/2015 | Banga et al. |
| 2015/0156203 A1 | 6/2015 | Giura et al. |
| 2015/0161277 A1 | 6/2015 | Heller et al. |
| 2015/0248554 A1 | 9/2015 | Dumitru et al. |
| 2015/0281176 A1 | 10/2015 | Banfield |
| 2016/0057167 A1 | 2/2016 | Bach |
| 2016/0134549 A1 | 5/2016 | Abel et al. |
| 2016/0154539 A1 | 6/2016 | Buddhiraja et al. |
| 2016/0226834 A1 | 8/2016 | Dawson |
| 2016/0246974 A1 | 8/2016 | Broz et al. |
| 2016/0248754 A1 | 8/2016 | Jahr |
| 2016/0292694 A1 | 10/2016 | Goldschlag et al. |
| 2016/0308895 A1 | 10/2016 | Kotler et al. |
| 2017/0034174 A1 | 2/2017 | Jagers |
| 2017/0041338 A1 | 2/2017 | Martini et al. |
| 2017/0076092 A1 | 3/2017 | Kashyap et al. |
| 2017/0142144 A1 | 5/2017 | Weinberger et al. |
| 2017/0180413 A1* | 6/2017 | Petry ..................... H04L 63/123 |
| 2017/0206351 A1 | 7/2017 | Jay et al. |
| 2017/0208067 A1 | 7/2017 | Sriramakrishnan |
| 2017/0250997 A1 | 8/2017 | Rostamabadi et al. |
| 2017/0293432 A1 | 10/2017 | Oldcorn et al. |
| 2017/0317978 A1 | 11/2017 | Diaz-Cuellar et al. |
| 2017/0353496 A1* | 12/2017 | Pai ....................... H04L 63/1441 |
| 2017/0359309 A1 | 12/2017 | Bolte et al. |
| 2018/0027006 A1 | 1/2018 | Zimmermann et al. |
| 2018/0115519 A1 | 4/2018 | Bonomi et al. |
| 2018/0139178 A1 | 5/2018 | Gan |
| 2018/0196945 A1 | 7/2018 | Kornegay et al. |
| 2018/0198824 A1 | 7/2018 | Pulapaka et al. |
| 2018/0203995 A1* | 7/2018 | Yuen ....................... G06F 9/544 |
| 2018/0234422 A1 | 8/2018 | Odom et al. |
| 2018/0276396 A1 | 9/2018 | Yablokov et al. |
| 2018/0330257 A1 | 11/2018 | Dodson et al. |
| 2018/0367528 A1 | 12/2018 | Schwarz et al. |
| 2019/0097970 A1 | 3/2019 | Coleman et al. |
| 2019/0097972 A1 | 3/2019 | Coleman et al. |
| 2019/0098007 A1 | 3/2019 | Coleman et al. |
| 2019/0098020 A1 | 3/2019 | Martz et al. |
| 2019/0121961 A1 | 4/2019 | Coleman et al. |
| 2019/0121962 A1 | 4/2019 | Coleman et al. |
| 2019/0213325 A1 | 7/2019 | McKerchar et al. |

OTHER PUBLICATIONS

Burnett, Mark, "How I Secured One Company's Network", Using Log Parser, Virtualization, and A Little Psychology, Sep. 17, 2006, 4 pages.

Laverick, Mike, "Hypervisor Management and Optimization for Advanced Virtualization", Advanced Virtualization E-Book, 2010, 13 pages.

(56) References Cited

OTHER PUBLICATIONS

Li et al., "VSITE: A Scalable and Secure Architecture for Seamless L2 Enterprise Extension in the Cloud", 6th IEEE Workshop on Secure Network Protocols, Kyoto, Oct. 2010, pp. 31-36.

Reuben, Jenni Susan, "A Survey on Virtual Machine Security", TKK T-110.5290 Seminar on Network Security, Oct. 11-12, 2007, 5 pages.

Villeneuve, Nart, "Command and Control in the Cloud", Malware Explorer, Oct. 22, 2010, 3 pages.

Wikipedia, "Computer Networking", Available at https://en.wikipedia.org/wiki/Computer_network, Dec. 2010, 19 pages.

Wikipedia, "Computer Security", Available at https://en.wikipedia.org/wiki/Computer_security, retrieved on Dec. 2010, 27 pages.

Wikipedia, "Cyber Security Standards", Available at https://en.wikipedia.org/wiki/Cyber_security_standards, retrieved on Dec. 2010, 9 pages.

Wikipedia, "HTTP Secure", Available at https://en.wikipedia.orq/wiki/HTTPS, retrieved on Dec. 2010, 9 pages.

Wikipedia, "Hypervisor", Available at https://en.wikipedia.org/wiki/Hypervisor , retrieved on Dec. 2010, 6 pages.

Wikipedia, "Internet Protocol", Available at htpps://en.wikipedia.org/wiki/Internet_Protocol, retrieved on Dec. 2010, 5 pages.

Wikipedia, "Multiprotocol Label Switching", Available at https://en.wikipedia.org/wiki/Multiprotocol_Label_Switching , retrieved on Dec. 2010, 8 pages.

Wikipedia, "Network Address Translation", Available at https://en.wikipedia.org/wiki/Network_address_translation, Dec. 2010, 12 pages.

Wikipedia, "Security-Focused Operating System", Available at https://en.wikipedia.org/wiki/Security-focused_operating_system, retrieved on Dec. 2010, 9 pages.

Wikipedia, "Virtual Desktop", Available at https://en.wikipedia.org/wiki/Virtual_desktop, Retrieved on Dec. 2010, 5 pages.

Wikipedia, "Virtual Private Network", Available at https://en.wikipedia.org/wiki/Virtual_private_network, retrieved on Dec. 2010, 9 pages.

"NPL Search Term", Web Search History, 1 page.

Azab et al., "SICE: A Hardware-Level Strongly Isolated Computing Environment for x86 Multi-Core Platforms", Proceedings of the 18th ACM Conference on Computer and Communications Security, Oct. 2011, pp. 375-388.

Bruckman et al., ""Georgia Computes!": Improving the Computing Education Pipeline", Proceeding of the 40th ACM Technical Symposium on Computer Science Education, 2009, pp. 86-90.

Comodo, "Comodo Internet Security", Software Version 7.0, User Guide Version 7.0. 111114, 2014, pp. 1-579.

Gupta et al., "A Secure Architecture Design Based on Application Isolation, Code Minimization and Randomization", IEEE 6th Symposium on Security Analytics and Automation 2013, 2013, pp. 423-429.

Haq et al., "Design and Implementation of Sandbox Technique for Isolated Applications", IEEE School of Computer Science and Technology, Beijing Institute of Technology, Beijing, China, 2016, pp. 557-561.

Hsu et al., "Enforcing Least Privilege Memory Views for Multithreaded Applications", Proceedings of the 2016 ACM SIGSAC Conference on Computer and Communications Security, Oct. 2016, pp. 393-405.

Jauernig et al., "Trusted Execution Environments: Properties, Applications, and Challenges", IEEE Computer and Reliability Societies, Resilient Security, Mar.-Apr. 2020, pp. 56-60.

Jung et al., "An Architecture for Virtualization-Based Trusted Execution Environment on Mobile Devices", 2014 IEEE 11th International Conference on Ubiquitous Intelligence and Computing and 2014 IEEE 11th International Conference on Autonomic and Trusted Computing and 2014 IEEE 14th International Conference on Scalable Computing and Communications and, Associated Symposia/Workshops, 2014, pp. 540-547.

Kostiainen et al., "Dedicated Security Chips in the Age of Secure Enclaves", IEEE Computer and Reliability Societies; Hardware-Assisted Security, Sep.-Oct. 2020, pp. 38-46.

Le et al., "Computing the Real Isolated Points of an Algebraic Hypersurface", International Symposium on Symbolic and Algebraic Computation, Aug. 24, 2020, 12 pages.

Liu et al., "Thwarting Memory Disclosure with Efficient Hypervisor-Enforced Intra-Domain Isolation", Proceedings of the 22nd ACM SIGSAC Conference on Computer and Communications Security, Oct. 2015, pp. 1607-1619.

Srivastava et al., "Tamper-Resistant, Application-Aware Blocking of Malicious Network Connections", School of Computer Science, Georgia Institute of Technology, 2008, pp. 39-58.

Yadav et al., "Impact & Analysis of Virtual Workspace on Grid Computing", International Journal of Science & Technology (IJST), vol. 2, Issue 2, Apr. 2012, pp. 24-32.

Yee et al., "Native Client: A Sandbox for Portable, Untrusted x86 Native Code", 2009 30th IEEE Symposium on Security and Privacy, 2009, pp. 79-93.

Chen, Yaohui et al., "Shreds: Fine-Grained Execution Units", 2016 IEEE Symposium on Security and Privacy, 2016, pp. 1-16.

Evtyushkin, Dmitry et al., "ISO-X: A Flexible Architecture for Hardware-Managed Isolated Execution", 2014 47th Annual IEEE/ACM International Symposium on Microarchitecture, 2014, pp. 1-13.

Mambretti, Andrea et al., "Trellis: Privilege Separation for Multi-User Applications Made Easy", 2016, pp. 1-20.

* cited by examiner

SERVICE PROVIDER ADVANCED THREAT PROTECTION

CROSS-REFERENCE TO RELATED APPLICATIONS

This application claims the benefit of U.S. Provisional Patent Application No. 62/549,693, filed Aug. 24, 2017, the contents of which is hereby incorporated by reference in its entirety.

BACKGROUND

The Internet provides access to a large number of systems from which beneficial and/or harmful data may be retrieved by a host computer system attached to and communicating over the Internet. Harmful data that can be accessed through the Internet includes a variety of viral software constructs, generally referred to as malicious software or malware. Malware may be downloaded to a host computer system unintentionally, for example, by and/or without the knowledge of the user of the host computer system.

A host computer system that has downloaded malware may be referred to as an infected host computer system. An infected host computer system may result in possible security losses, reduction of efficiency, and/or malfunctions. Security losses may include, but are not limited to, the loss of some or all data that is accessible by the infected host computer system, the installation of additional malware onto the infected host computer system, and/or the loss of command and control of the infected host computer system. Reduction of efficiency may be incurred from, but not limited to, additional processor demand, additional memory usage, and/or additional network access by the executing malware The security and privacy of the user of the infected host computer system may be compromised by malware. Both information located on the infected host computer system and/or information stored on or communicated via a local area network may be susceptible to attack by the malware. In many instances, an infected host computer may be used by the malware as a vehicle to stage an attack on other network resources that are accessible from the infected host computer system. Such an attack method is often undetected by the user of the host computer system and/or network administrators.

An infected host computer system may lose command and control. The loss of command and control of the infected host computer system may include performing one or more actions the author of the downloaded malware may desire. For example, the malware may perform a reconnaissance of the infected host computer system, determine system privileges, access local files, access security tokens, and/or attempt infection or access of other network resources accessible from the infected computer system

SUMMARY

Methods and systems are disclosed for enabling one or more network service providers to provide network and system isolation for one or more computer systems utilizing a service provided by the network service provider. For example, techniques are disclosed for one or more network elements within the service provider network to protect communications from a host system and/or to allow the installation of software on the host computer system for implementing local policies for network isolation. The network service provider may provide one or more interfaces or applications that allow the customization of protection for certain host computer systems operating on the service provided networks. For example, the types of isolation techniques used, the identification of trusted vs. untrusted network destinations, the types of authentication techniques used, and/or the like may be customizable per user (e.g., of the service provider) and/or per host computer system. Examples of service providers may include, but are not limited to, Internet Service Providers (ISPs), cellular service providers, administrators of Wi-Fi and/or ad hoc networks, and/or the like.

As an example, a host machine's communication may be isolated from one or more untrusted network destinations. A networked computer system may include a service provider network, a host computer system, a border firewall, and/or a proxy device. The host computer system may include a processor and memory. The host computer system may connect to the service provider network, for example, via one or more of a local network, a local area network (LAN), a wide area network (WAN), a cellular network, a Wi-Fi network, a digital subscribers line (DSL) network, a cloud computing network, an ad-hoc network, a satellite network, a cable modem network, and/or the like. The cloud computing network may include one or more of an Infrastructure as a Service (IaaS) application, a Platform as a Service (PaaS) application, a data center, a virtual machine, a server, and/or the like. The networked computer system may be configured to implement network isolation between one or more untrusted network destinations and the network. The network isolation may be implemented via one or more of a host-based firewall on the host computer system, a local firewall between a local network and the service provider network, a border firewall around a portion of the service provider network that includes the host computing system, a proxy device, an internal isolation firewall on the host computer system, and/or a segregation of a trusted memory space and an untrusted memory space.

The host computer system may be configured to communicate with one or more untrusted network destinations via a first communication channel. The host computer system may be configured to communicate with one or more trusted network destinations via a second communication channel. The host computer system may be configured to enforce separation of the first communication channel and the second communication channel. Malware may be introduced to the host computer system. The malware may be prevented from moving to other devices on the networked computer system. The host computer system may be configured to send web traffic to the one or more trusted network destinations via the service provider network, the local network and/or the local firewall.

The host-based firewall may be configured to prevent lateral communication and/or movement of malware between the host computer system and other devices on the local network. The proxy device may be configured to prevent unauthorized communication between the host computer system and the one or more untrusted network destinations. The segregation of the trusted memory space and the untrusted memory space may be enforced by the internal isolation firewall. The host-based computer system may be configured to run one or more applications and/or processes in the untrusted memory space that are configured to communicate with the one or more untrusted network destinations. The host computer system may be configured to run one or more applications and/or processes in the trusted memory space that are configured to communicate with one or more trusted devices. A trusted device may be on the local network, the service provider network, the Internet, and/or the like. A trusted device may be predetermined and/or may be selected via the host computer system.

A service provider network may include one or more network devices. The one or more network devices may include one or more servers, a firewall, an authorization device, and/or a proxy device. The service provider network may be configured to determine network isolation configuration information for a client device on a LAN. The network isolation configuration information may include an identification of trusted network destination and/or untrusted network destinations for the client device. For example, the network isolation configuration information may include a whitelist and a blacklist for each client device associated with the LAN. The whitelist may identify the trusted network destinations and the blacklist may identify the untrusted network destinations. The service provider network may send the network isolation configuration information to the client device. The service provider network may receive, from the client device, a request for the network isolation configuration information. For example, the service provider network may send the network isolation configuration information to the client device upon receiving the request.

The service provider network may be configured to authenticate a segregated memory space operating on the client device. For example, the service provider network may receive client credentials from the segregated memory space. The service provider network may authenticate the segregated memory space using the received client credentials. The service provider network may be configured to receive, from an application or process operating in the segregated memory space, a request to communicate with an untrusted network destination. The service provider network may allow, based on the network isolation configuration information and on the authentication of the segregated memory space, the application or process operating in the authenticated segregated memory space to communicate with the untrusted network destination. The service provider network may be configured to receive, from an application or process operating on a workspace of the client device, a request to communicate with an untrusted network destination. The workspace may be isolated from the authenticated segregated memory space. The service provider network may be configured to prevent the application or process operating on the workspace of the client device from communicating with the untrusted network destination based on the request being from outside the authenticated segregated memory space.

The firewall may be configured to block ports, protocols, and/or traffic between unauthenticated devices on the LAN and untrusted network destinations. The LAN may include a plurality of client devices associated with a client account. The service provider network (e.g., the one or more network devices) may be configured to implement a client portal associated with the client account. The service provider network may be configured to provide, via the client portal, a client portal interface accessible by at least one of the plurality of client devices associated with the client account. The client portal interface may be configured to enable modification of the network isolation configuration information by the at least one of the plurality of client devices associated with the client account. The service provider network may be configured to push, via the client portal to the plurality of client devices, a patch, an update, and/or a security control.

The service provider network may be configured to receive, from an application or process operating on the workspace of the client device, a request to communicate with a network destination. The service provider network may be configured to determine, based on the network isolation configuration information, that the network destination is a trusted network destination. The service provider network may be configured to allow the application or process operating on the workspace of the client device to communicate with the trusted network destination.

The service provider network (e.g., the one or more servers) may be configured to implement a local firewall on one or more of the client devices. The local firewall may be configured to prevent communications between the one or more client devices on the LAN.

DETAILED DESCRIPTION

Systems and methods are disclosed for advanced threat protection for local networks and/or one or more devices operating on the local networks. A local network may include a home network, a small business network, and/or a medium business network. As may be appreciated, numerous local networks may be hosted by a single service provider. For example, an internet service provider (ISP) may provide services to hundreds or thousands of users, small businesses, and/or medium-sized businesses. The level of protection provided for different subnetworks of the service provider may be customizable, distinct, or otherwise configurable. For example, the service provider may provide a user with an interface or portal that allows the user to define the specific types of threat protection to be implemented on the devices associated with the user and/or the portions of the ISP network that are exposed to the user devices. For example, the level of isolation provided by a firewall of the ISP, the identification of trusted and/or untrusted sites accessed by the user (e.g., and the means used for accessing sites of each designation), and/or the communication paths within the network used by the user may be configurable for each user and/or subnetwork, which would allow the ISP to implement robust protections while differentiating the amount of protection provided per user and/or subnetwork.

For example, such threat protection may include preventing lateral communications between devices on a local network. Preventing lateral communication may prevent movement of malware between the devices on the local network. The advanced threat protection may include isolation of a host computer system's communication with one or more untrusted network destinations. Isolating the host computer system's communication with one or more untrusted network destinations may protect the host computer system from one or more of command and control infection, data exfiltration, or general automated infection that can occur from communicating with the untrusted network destinations. A host computer system may securely browse, access, and/or communicate with untrusted network destinations, including but not limited to resources accessible via the Internet. The host computer system may be a laptop computer, a mobile phone, a tablet, etc. The host computer system may be connected to an ISP network (e.g., via one or more of a local network, a local area network (LAN), a wide area network (WAN), a cellular network, a Wi-Fi network, a digital subscribers line (DSL) network, a cloud computing network, an ad-hoc network, a satellite network, a cable modem network, etc.). The host computer system may be a physical machine, a virtual machine, or a combination thereof. The isolation of the host computer system's communication with the one or more untrusted network destinations may be enforced via the host computer system itself and/or via ISP infrastructure. The ISP infrastructure may include one or more routers, Web Cache Communication Protocol (WCCP) routing, one or more web proxies, one or more enterprise firewalls, one or more managed services devices and/or other ISP architecture.

The advanced threat protection may be configured to isolate communications associated with one or more web-based applications from other network environment communications. For example, the web-based applications may communicate via a first communication channel and the other network environment communications may use one or more other communication channels. The first communication channel may be reserved for communications with untrusted network destinations and/or untrusted devices. The first communication channel may be isolated from the one or more other communication channels. The first communication channel may be established between a segregated memory space and a proxy device. For example, the proxy device may authenticate the first communication channel and/or the segregated memory space. The web-based applications may include web browsers, file transfer applications, email applications, chat or instant messaging applications, peer-to-peer (P2P) file sharing applications, automatic web backup applications (e.g., to cloud services), anti-virus and other security applications, collaboration software applications, remote desktop applications, screen and resource sharing applications, gaming applications, applications that rely on cloud resources for processing resources, and/or the like. Examples of web browsers may include Internet Explorer, Safari, Mozilla, Chrome, etc. The file transfer applications may include FileZilla, WinSCP, CyberDuck, FireFTP, etc. The collaboration software applications may include WebEx, LiveMeeting, HP Virtual Room, etc. As may be appreciated, many of these types of applications rely on robust communication networks that allow the application to connect to and communicate with remote locations. However, such reliance can create avenues of attack for malware and other exploits that can utilize the capacities and resources offered to these applications as a means to attack and or control the host computing system.

Systems and methods are described to provide a layer of isolation between these diverse types of applications and untrusted network destinations in order to prevent malware from effectively exfiltrating data from the host computer system and/or establishing command and control channels with attacker resources in order to attempt to gain control of the host computing system. For example, the communication isolation may protect a local network from a computer system operating within the local network, that runs a collaboration software. The computer system may isolate the collaboration software from other applications and/or processes operating on the computer system.

The following description sets forth one or more security mechanisms/computer isolation aspects that may be used by a service provider to protect one or more devices or sub-networks attached to the service provider's network. The following description sets forth example protection/isolation capabilities, and as is set forth in more detail below, the manner in which such capabilities are provided to a given system or client, the set of capabilities utilized by a given system or client, and/or the configurations established for a given system or client may be distinct or otherwise configurable on per-device or per-client basis.

Communication isolation may be provided via untrusted memory space segregation. The host computer system may have a sandbox protected application or process and/or an internal isolation firewall running thereon. For example, one or more of the web browsers, file transfer applications, email applications, chat or instant messaging application, P2P file sharing applications, automatic web backup application, anti-virus and other security applications, collaboration software applications, remote desktop applications, screen and resource sharing applications, gaming applications, applications that rely on cloud resources for processing resources, and/or the like may wholly or partially be contained in a sandboxed computing environment. In an example, other isolation methods such as operating the applications within a virtual machine may be used.

The sandbox protected application or process may operate within a sandboxed computing environment. The sandboxed computing environment may include resources (e.g., a limited set of resources) allocated for operation of a sandbox container process. The sandboxed computing environment may be enforced via the sandbox container process. The sandbox container process may be a security mechanism used to separate the sandboxed computing environment from other applications and/or processes that may be running on a workspace of the host computer system. The sandboxed container process may be configured to enable one or more applications and/or processes (e.g., such as a browser process) being executed within the sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace.

The workspace may include one or more processes operating within the operating system that are not restricted by the sandbox container process. The operating system of the host computer system may include a set of resources configured to enable operation of the workspace and the sandbox container process.

The sandbox container process may have access to one or more operating system and/or kernel processes in order to enforce isolation between the workspace associated with the first memory space and the sandboxed computing environment associated with the second memory space. The sandbox container process may enforce the segregation using techniques such as namespace isolation such that processes running in the sandboxed computing environment in the second memory space are restricted from accessing the first memory space including the workspace (e.g., and vice versa). The sandbox container process may restrict access to certain resources by processes running in the sandboxed computing environment. The sandboxed container process may allow the workspace and the sandboxed computing environment to share access to the host operating system and host operating resources (e.g., including the kernel and libraries) while enforcing the segregation of the memory spaces accessed by the workspace and the sandboxed computing environment. In this manner, the sandbox container process may permit isolation of the sandboxed computing environment without requiring the sandboxed computing environment to boot a separate operating system, load separate libraries, etc., which would require separate private memory for those files.

The one or more processes or applications operating within the sandboxed computing environment may be permitted to access untrusted network destinations via an access connection device. The access connection device may be a proxy device, for example. The one or more processes or applications operating within the sandboxed computing environment may connect to the untrusted network destinations as a dedicated network interface device with using a specific Internet Protocol (IP) address. The one or more processes or applications operating within the sandboxed computing environment may be referred to as sandboxed processes or applications. The host computer system may maintain a list of untrusted network destinations and/or a list of trusted network destinations. The list of trusted network destinations may be a whitelist. The list of untrusted network destinations may be a blacklist. The whitelist and the blacklist may be refined based on username and/or machine identification (ID). For example, the lists of trusted and untrusted network destinations may be different for different users and/or machines associated with a respective network. The whitelist and/or the blacklist may be associated with one or more access levels. For example, a first whitelist and a first blacklist may be assigned to a first access level. An untrusted network destination may be an untrusted resource, an untrusted device, an untrusted website, and/or the like. Since the untrusted network destinations may be sources of malware, the one or more processes or applications operating within the sandboxed computing environment may be allowed to communicate with the untrusted network destination(s), but other communication from the host computer system (e.g., communications originating from outside the sandboxed computing environment such as from within the workspace) to the untrusted network destination(s) may be prevented.

Communication isolation may be provided via a host-based firewall. The host-based firewall may be configured to prevent unauthorized communication between applications and/or processes operating in the workspace of the host computer system to other devices on the network over which the host computer is communicating. The host-based firewall may be configured to block incoming communications to the workspace of the host computer system, except for predetermined trusted devices and/or predetermined network ports. A trusted device may be on the local network, the service provider network, the Internet, and/or the like. A trusted device may be predetermined and/or may be selected via the host computer system. The host-based firewall may allow outgoing communications to be sent from a process in the workspace to a non-web-based (e.g., LAN destination).

Communication isolation may be provided via an internal isolation firewall. The internal isolation firewall may enable separation between the sandboxed computing environment and the workspace. The applications and/or processes operating within the sandboxed computing environment may be prevented from accessing any additional resources of the host computer system or may be prevented from accessing any additional resources of the host computer system without explicit user action. For example, the internal isolation firewall may generate a command prompt that enables a user selection if an application and/or process operating within the sandboxed computing environment is requesting access to resources outside of the sandbox memory space. By prompting the user to confirm that the applications and/or processes operating within the sandboxed computing environment are permitted to access additional resources outside the sandbox memory space, malware that is designed to attempt to remain transparent to the user may be limited to operation within the sandboxed computing environment. Thus, the malware within the sandboxed computing environment may be unable to access other resources available to the host system generally, such as local area networks and secure memory regions.

The internal isolation firewall may allow certain actions to be performed with approval of the user of the host system. For example, an application and/or process operating within the sandboxed computing environment may be allowed access to the host system to perform one or more of a cut or copy of data, a paste of data, a printing of data to a local printer, a file transfer, and/or the like. The host computer system may prevent one or more other transfers of data between the sandboxed computing environment and the workspace except those user initiated actions described herein. For example, the sandbox container process may prevent unauthorized data transfers between the sandboxed computing environment and the workspace.

Figure 1:
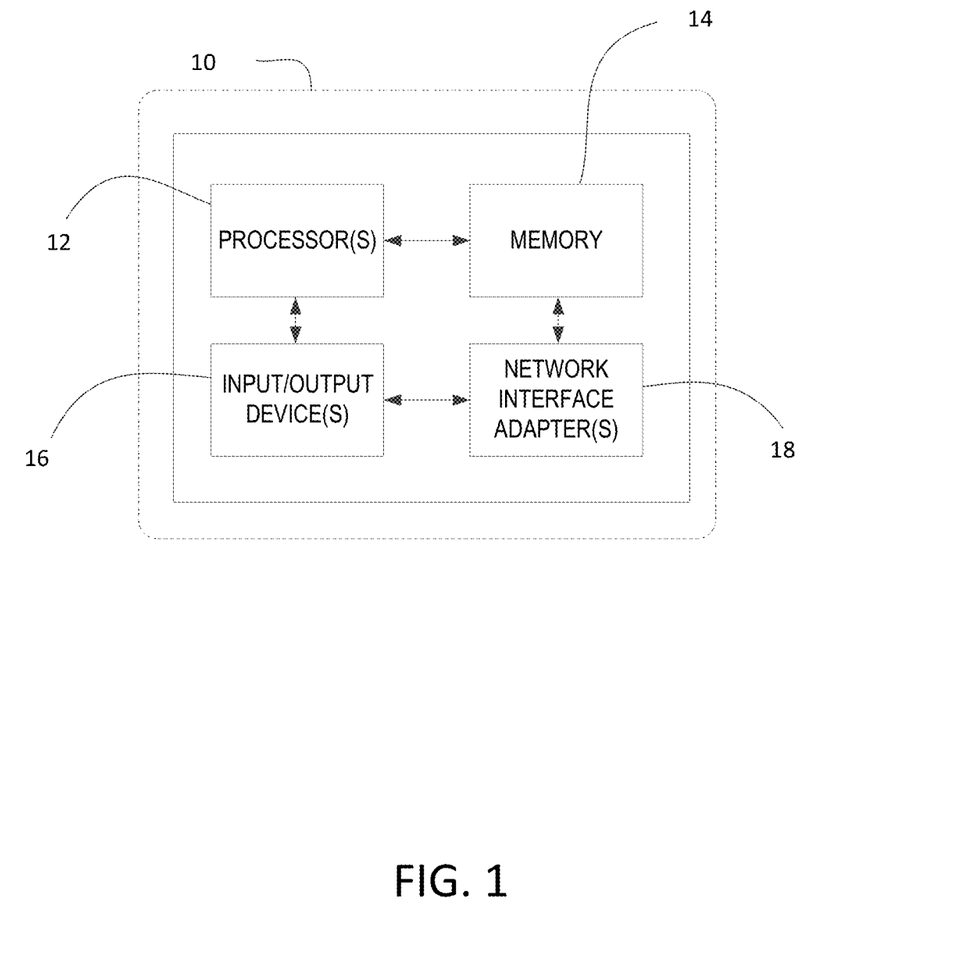
FIG. 1 depicts an example host computer system.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox-based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include an internal isolation firewall. The internal isolation firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a sandbox protected application or process may be used for communicating with untrusted sources, such as Internet based resources. In this manner, if malware is transferred back to the host computer system due to interactions with the untrusted source, the malware may be isolated to the sandboxed computing environment, which may make it difficult for the malware to infect the workspace of the host computer system. For example, the sandbox container process may prevent the malware toolset from performing a reconnaissance of the host computer system to assess what data is available from the host computer system, such as computing resources, files, network information, additional network connectivity, etc. The sandbox container process (e.g., the internal isolation firewall) may prevent the data on the host computer system from being reported back to the remote device that sent the malware to the host computer and/or any other remote devices.

The sandbox container process may prevent the malware toolset from determining user system privileges of the host computer system, which can be used to access data on any associated network or local area network. For example, applications and/or processes operating within the sandboxed computing environment may not have access and/or authorization to such host computer configurations.

The sandbox container process may prevent the malware toolset from accessing local files stored on the host computer system. For example, the sandbox container process may isolate the first memory space from the second memory space. Such isolation can help prevent the malware from attempting to transmit such information back to the remote device that is the source of the malware. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The sandbox container process may prevent the malware toolset from accessing a security token and/or hash of the host computer user from the memory of the host computer system and/or a network data stream. This security token or hash can be used to gain access to other resources on any associated network or the local area network. Where the security token or hash is for a privileged user account, this security token or hash may be used to gain privileged access to other resources on any associated network or local area network.

The sandbox container process may prevent the malware toolset from enabling remote control and/or access of the host computer system by a remote device that is unknown to the user. When malware enables remote control and/or access, the remote device may be able to control one or more (e.g., all) operations of an infected host computer system and perform whatever alternative uses that an enslaved, infected host computer system can perform. For example, a remote device may download additional data to an infected host computer system, access other websites for denial of service attacks, and/or convert the infected host computer system into a source of malicious software from which toolsets or secondary payloads are downloaded to other, subsequently infected, host computer systems.

Figure 2:
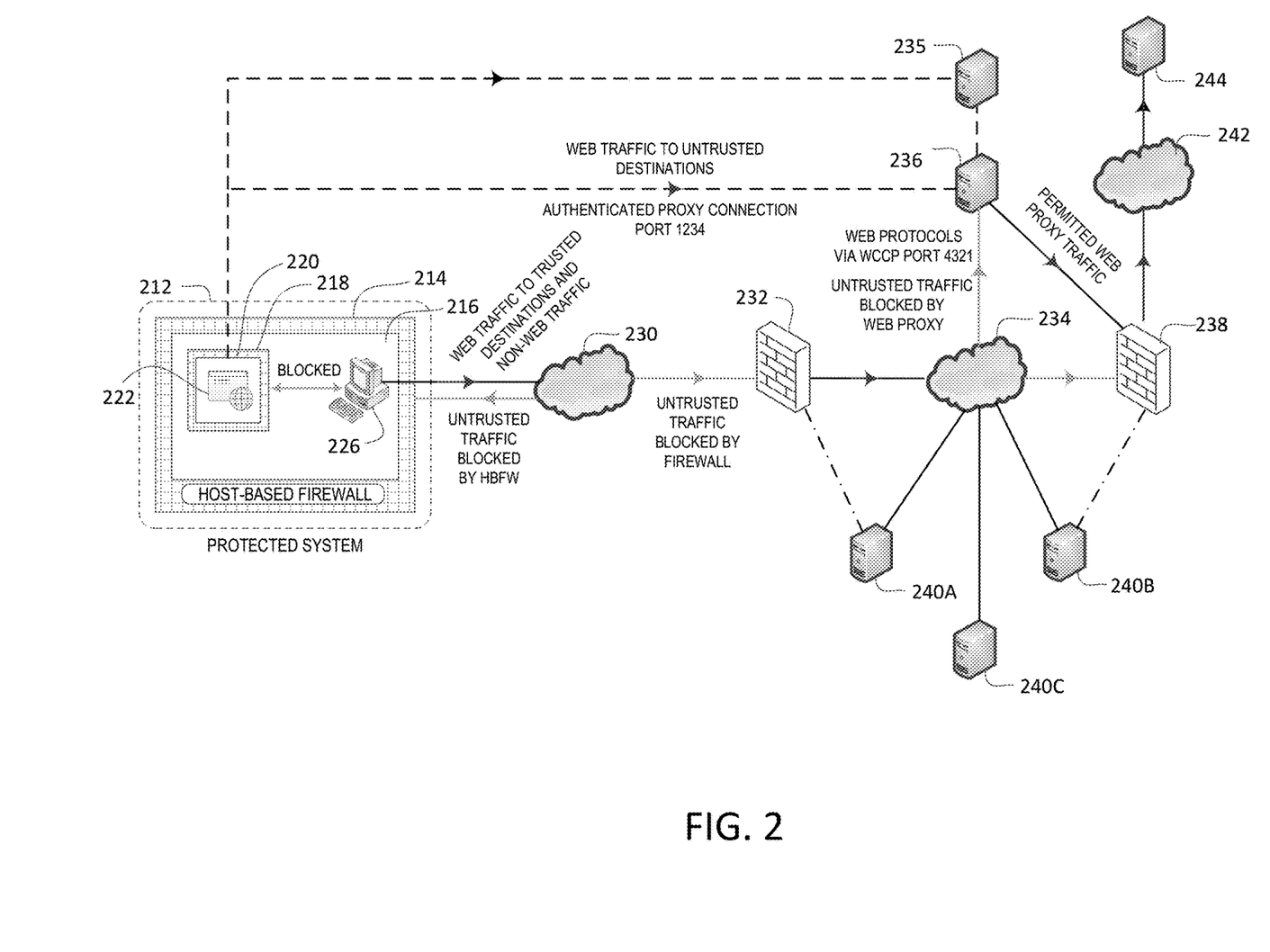
FIG. 2 depicts an example host computer system connected to a service provider network, the example host computer system using a sandbox-based network isolation system.

FIG. 2 depicts an example host computer system 212 connected to a service provider (e.g., ISP) network 234, the example host computer system 212 may include a sandbox-based network isolation system. The host computer system 212 may include a host-based firewall 214, an operating system 226, a sandboxed computing environment 220, an internal isolation firewall 218, and a workspace 216. The host computer system 212 may be any host computer system, such as a cell phone, a pager, a personal computer (PC), a laptop, a vehicle computer system, a kiosk computer system, a server, a workstation, a tablet, a smartphone, a router, a controller, a microcontroller, and/or any other processing and/or communication device. The host computer system 212 may be operatively connected with one or more user-accessible data entry devices, a display device viewable by a user, and/or a computer-accessible data storage. One or more application programs may run on the operating system 226.

As an example, the host computer system 212 may be a PC, with 4 GB RAM and 146 GB hard disk computer-accessible storage, a monitor, a keyboard, and a mouse. The operating system 226 may be Windows-based, Linux-Based, Macintosh-based, and/or the like. The computer-accessible storage may store data corresponding to one or more software programs (e.g., computer-readable instructions) stored on the host computer system 212 for common operation. The software programs may include word processing programs, accounting programs, remote connectivity programs, and/or other types of applications.

The host computer system 212 may be configured to isolate communication with untrusted network destinations. The host computer system 212 may isolate communication with untrusted network destinations using one or more of the host-based firewall 214, a local firewall 232, a border firewall 238 (e.g., an ISP firewall), a proxy device 236 (e.g., an ISP web proxy), an internal isolation firewall 218, or a segregation of untrusted memory space. For example, the service provider network 234 may include one or more network devices. The one or more network devices may include the border firewall 238, the proxy device 236, an authorization device 235, and/or one or more servers (e.g., such as managed devices 240A, 240B, 240C). The proxy device 236 and the border firewall 238 may be implemented in a single device. The proxy device 236 and the authorization device 235 may be implemented in a single device.

The host-based firewall 214 may enable isolation of the host computer system's communication with one or more untrusted network destinations by preventing lateral communication with other devices connected to a local network 230. The local network 230 may be a home network, a small business network (e.g., a network operated by a small-sized business), or a medium business network (e.g., a network operated by a medium-sized business). For example, the host computer system 212 may receive untrusted traffic from the local network 230. The host-based firewall 214 may be configured to block the untrusted traffic from the local network 230. The host-based firewall 214 may be configured to block all incoming traffic from the local network 230. The host-based firewall 214 may be configured to allow traffic received by the host computer system 212 via one or more predetermined devices and/or ports. One or more devices (e.g., predetermined devices) connected to the local network 230 may bypass the host-based firewall 214, for example, using a predetermined set of protocols and/or ports. One or more ISP controlled devices (e.g., that may provide updates and/or security controls) may bypass the host-based firewall 214, for example, using a predetermined set of protocols and/or ports.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the host computer system 212, for example the Windows operating system firewall. The host-based firewall 214 may be implemented using software for configuring and/or implementing restrictive ingress and/or egress policies on the host computer system 212.

The proxy device 236 may enable isolation of the host computer system 212 from one or more untrusted network destinations. The service provider network 234 may be configured to utilize a Web Cache Control Protocol. The service provider network 234 may redirect web related traffic that is intended for an untrusted resource or network destination (e.g., such as the Internet 242) to the proxy device 236, for example, using the Web Cache Control Protocol. For example, the service provider network 234 may receive traffic via web related traffic from the host computer system 212 via the local network 230 and/or a local firewall 232. The service provider network 234 (e.g., a router in the service provider network 234) may redirect the web related traffic to the proxy device 236, for example. The Web Cache Control Protocol may route the web-related traffic to the proxy device 236 via a predetermined network port, for example, network port 4321 as shown. The proxy device 236 may determine (e.g., uniquely distinguish) that the traffic received from the service provider network 234 is via the Web Cache Control Protocol, for example, based on the network port. The proxy device 236 may be configured to block traffic associated with an untrusted network destination. The proxy device 236 may receive requests from one or more applications and/or processes operating within the workspace 216 of the host computer system 212. The proxy device 236 may be configured to block one or more requests sent from the one or more applications and/or processes operating within the workspace 216 of the host computer system 212, for example, based on the one or more requests being associated with the network port on which it is received, for example 4321.

The proxy device 236 may be configured to allow one or more processes and/or applications (e.g., browser process 222) operating within the sandboxed computing environment 220 of the host computer system 212 to access an untrusted network destination. A sandbox container process may enable the sandboxed computing environment 220. The sandbox container process may authenticate with the proxy device 236 and/or the authorization device 235 on behalf of the one or more processes and/or applications operating within the sandboxed computing environment. The sandbox container process may be configured to authenticate with the proxy device 236 and/or the authorization device 235 using preconfigured credentials stored within an encrypted configuration file. When the sandbox container process has successfully authenticated with the proxy device 236 and/or the authorization device 235, the proxy device 236 may allow the one or more processes and/or applications operating within the sandboxed computing environment 220 to access the untrusted network destination. One or more communication channels of the host computer system 212 may authenticate with the proxy device 236 and/or the authorization device 235.

The local firewall 232 may be configured to block untrusted traffic received from the local network 230. The local firewall 232 may be configured to allow web traffic to trusted destinations and/or non-web traffic to reach the service provider network 234. The local firewall 232 may be implemented using software and/or hardware. For example, the local firewall 232 may be implemented using one or more of Sophos, a Netgear device, an F-Secure device, a Fortinet device, a cisco device, a sonic wall device, a ubiquiti device, a dlink device, a BitDefender BOX, a cable modem, a cable modem/router combination, a local router device, an OS firewalls, etc. The local firewall 232 may be implemented by a device on the local network 230 (e.g., such as a router, modem, etc.). For example, the local firewall 232 may be implemented using software inherent operating on a device on the local network 230. The local firewall 232 may be implemented using software for configuring and/or implementing restrictive ingress and/or egress policies on the local network 230. The local firewall 232 may be implemented by the service provider network 234.

The border firewall 238 may enable isolation of the host computer system 212 (e.g., the workspace 216) from one or more untrusted network destinations. The border firewall 238 may be configured to restrict traffic to the untrusted network destinations (e.g., the Internet 242) from the proxy device 236 and/or the service provider network 234. The host computer system 212 may access a whitelisted web server and/or an untrusted web server, for example, via the border firewall 238. The border firewall 238 may be configured to block ports, protocols, and/or traffic between unauthenticated devices on the local network 230 and untrusted network destinations. For example, the border firewall 238 may be configured to block untrusted traffic that is not routed through the proxy device 236.

The service provider network 234 may support one or more managed services. The managed services may include management of the local firewall 232, management of the border firewall 238, a network isolation configuration, and/or management of a client portal. The service provider network 234 may include one or more network devices (e.g., such as managed services devices 240A, 240B, 240C). The one or more network devices may include one or more servers and/or a proxy device. The one or more servers may be configured to manage network isolation configuration information. The proxy device may be configured to proxy communications between a segregated memory space (e.g., an authenticated segregated memory space) and an untrusted network destination. The one or more managed services devices may be configured to implement and/or manage the managed services. Although FIG. 2 shows more than one managed services device, it should be appreciated that the managed services may be implemented and/or managed by a single managed services device (e.g., such as a server, etc.). For example, managed services device 240A may be configured to implement and/or manage the local firewall 232. Managed services device 240B may be configured to implement and/or manage the border firewall 238. Managed services device 240C may be configured as a client portal. For example, the managed services device 240C may be configured to provide a client portal interface.

The service provider network 234 may enable the network isolation configuration. The network isolation configuration may be a managed service. For example, the service provider network 234 may determine network isolation configuration information associated with a client device (e.g., such as host computer system 212). The network isolation configuration information may include an identification of one or more trusted network destinations and/or one or more untrusted network destinations. The service provider network 234 may be configured to send the network isolation configuration information to the client device. The client device may be associated with a client account. The service provider network 234 may receive, from the client device, a request for the network isolation configuration information.

The service provider network 234 may be configured to implement the client portal. The client portal may be associated with the client account. The service provider network 234 may be configured to provide, via the client portal, the client portal interface. The client portal interface may be a customer web portal that enables access from one or more devices (e.g., such as the host computer system 212) on the local network 230. The client portal interface may be configured to enable modification of the network isolation configuration information. One or more client devices associated with the client account may modify the network isolation configuration information, for example, using the client portal interface. For example, the one or more client devices may be configured to modify one or more of a trusted list of network destinations, an untrusted list of network destinations, a whitelist, a blacklist, one or more blocked categories, or one or more allowed categories.

The client portal may enable the devices on the local network 230 to download configuration files. The configuration files may be encrypted. The service provider network 234 may push the configuration files to one or more devices (e.g., such as the host computer system 212) on the local network 230, for example, via the client portal. The service provider network 234 may push one or more patches, one or more updates, and/or one or more security controls to one or more devices on the local network 230, for example, via the client portal. For example, the service provider network 234 may push the configuration files to a set top box, a cable modem, a router, and/or a computer system on the local network 230. The service provider network 234 (e.g., the authorization device 235 and/or the proxy device 236) may be configured to authenticate a segregated memory space operating on a client device (e.g., such as the host computer system 212). The segregated memory space may be the sandboxed computing environment 220, for example. For example, the service provider network 234 may receive client credentials from the segregated memory space of the client device. The service provider network 234 may authenticate the segregated memory space using the received client credentials.

The service provider network 234 may provide one or more group authentication credentials to one or more users (e.g., customers) that subscribe and/or belong to a predefined configuration set. The service provider network 234 may implement robust protections while differentiating the amount of protection provided per user and/or per subnetwork The local firewall 232 and/or the border firewall 238 may implement one or more client specific rules. The client specific rules may be configured at least in part via the client portal. The client specific rules may be configured by the service provider. The local firewall 232 and/or the border firewall 238 may implement one or more configuration rules and/or policies that may be configured by the service provider.

The devices on the local network 230 may access the client portal via a graphical user interface (GUI) interface. For example, the client portal interface may be a GUI interface. The GUI interface may enable downloading and installation of the configuration files. The GUI interface may enable the user to configure one or more security and/or authentication settings. For example, the GUI interface may enable the user to configure security settings for multiple client devices and/or users on the local network 230. The security settings for multiple client devices and/or users may include internet access levels, an adult/child setting, a kids/parents setting, age based settings, and/or the like.

The host computer system 212 may access the service provider network 234 via the local network 230 and/or via another network (e.g., such as a local area network (LAN), a wide area network (WAN), a cellular network, a Wi-Fi network, a public network, a digital subscribers line (DSL) network, a cloud computing network, an ad-hoc network, a satellite network, a cable modem network, etc.). For example, the host computer system 212 may remotely access the service provider network 234. The host computer system 212 may remotely access the service provider network 234 via login and/or via a VPN client. The host computer system 212 may connect to the service provider network 234 at large. Authentication of the host computer system 212 with the service provider network 234 may be pre-configured. For example, the host computer system 212 may authenticate with the service provider network 234 while away from the local network 230. For example, the host computer system 212 may authenticate with the service provider network 234 via another network (e.g., such as a local area network (LAN), a wide area network (WAN), a cellular network, a Wi-Fi network, a public network, a digital subscribers line (DSL) network, a cloud computing network, an ad-hoc network, a satellite network, a cable modem network, etc.) besides the local network 230.

The service provider network 234 may provide security administration, updates, and/or patches to the host computer system 212. For example, the service provider network 234 may push one or more security updates and/or patches to one or more devices on the local network 230. The service provider network 234 may be configured to push one or more security updates and/or patches to the host computer system 212 whether connected to the local network 230 or another network. For example, the service provider network 234 may push the one or more security updates and/or patches to the host computer system 212 via a client portal.

The service provider network 234 may provide access to one or more security services and/or tools. For example, the service provider network 234 may enable access to the security services and/or tools by the host computer system 212. The security services and/or tools may include the host-based firewall 214, anti-virus/malware (AV) software, critical process monitoring, backup services, recovery services, the sandboxed computing environment 220, an intrusion detection system (IDS), an intrusion prevention system (IPS), a host intrusion prevention system (HIPS), and/or the like. For example, the service provider network 234 may be configured to implement a local firewall (e.g., such as the host-based firewall 214) on the host computer system 212 and/or other devices on the local network 230. The local firewall may be configured to prevent communications between the host computer system 212 and the other devices on the local network 230.

The service provider network 234 may be configured to check the integrity of the one or more security services and/or tools, for example, periodically. The service provider network 234 may be configured, at a predetermined time interval, to instantiate a new sandbox container process. For example, an existing sandbox container process may be operating in the segregated memory space. When the existing sandbox container process has been operating for the predetermined time interval, the new sandbox container process may be instantiated. When the new sandbox container process is instantiated, the service provider network 234 may be configured to terminate the existing (e.g., old) sandbox container process.

The sandboxed computing environment 220 may include resources (e.g., a limited set of resources) allocated to the operation of a sandbox container process. The sandboxed computing environment 220 may be enforced via the sandbox container process. The sandbox container process may be a security mechanism used to separate resources associated with the sandboxed computing environment 220 from other applications and/or processes that may be running on a workspace 216 of the host computer system 212. The sandboxed container process may be configured to enable one or more applications and/or processes (e.g., such as browser process 222) being executed within the sandboxed computing environment 220 to access the resources allocated for operation of the sandbox container process. For example, the one or more applications and/or processes being operated within the sandboxed computing environment 220 may be allowed to access memory associated with the sandboxed computing environment 220. The memory associated with the sandboxed computing environment 220 may be separate from memory that is configured to enable storage and operation of the workspace. 216.

The workspace 216 may include one or more processes operating within the operating system 226 that are not restricted by the sandbox container process. The operating system 226 of the host computer system 212 may include a set of resources configured to enable operation of the workspace 216 and the sandbox container process.

The host computer system 212 may enable the host-based firewall 214. The host-based firewall 214 may prohibit and/or prevent communication (e.g., direct communication) between the host computer system 212 and other devices on the local network 230. Each device on the local network 230 may include a host-based firewall (e.g., such as the host-based firewall 214). The host-based firewall 214 may prohibit and/or prevent communication (e.g., direct communication) between the host computer system 212 and other devices within the local network 230. For example, the host-based firewall 214 may be configured to block incoming traffic from the other devices within the local network 230. The host-based firewall 214 may allow traffic received by the host computer system 212 via one or more predetermined devices and/or ports. For example, one or more devices (e.g., predetermined devices) on the local network 230 may bypass the host-based firewall 214, for example, using a predetermined set of protocols and/or ports.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the host computer system 212, for example the Windows operating system firewall. The host-based firewall 214 may be implemented using software for configuring and/or implementing restrictive ingress and/or egress policies on the host computer system 212.

The host computer system 212 may run the sandboxed computing environment 220. The sandboxed computing environment 220 may run within the operating system 226 of the host computer system 212. For example, the sandboxed computing environment 220 may be configured to run within a second memory space of the host computer system 212. A first memory space may be configured to enable storage and operation of a workspace configured to execute a first set of one or more applications and/or processes running on the operating system 226 of the host computer system 212. For example, a browser process 222 may operate within the sandboxed computing environment 220. The sandboxed computing environment 220 may be prohibited from communicating with other devices within the local network 230. The browser process 222 may be configured to enable access to untrusted network destinations.

Browser solutions running within the workspace 216 of the host computer system 212 may be utilized for communication between the host computer system 212 and trusted network destinations. For example, the one or more applications or processes running within the workspace 216 of the host computer system 212 may enable access to the trusted network destinations. The service provider network 234 may receive, from an application or process operating in the workspace 216 of the host computer system, a request to communicate with a network destination. The service provider network 234 may determine, based on network isolation configuration information, that the network destination is a trusted network destination (e.g., on the whitelist). The service provider network 234 may allow the application or process operating in the workspace 216 to communicate with the trusted network destination.

The sandboxed computing environment 220 and/or the sandbox container process may be implemented using software and/or hardware. For example, the sandboxed computing environment 220 and/or the sandbox container process may be implemented using software that is commercially available, for example, such as Invincea Endpoint Protection, Tanium Endpoint Platform, Bromium Advanced Endpoint Security, etc.

The sandboxed computing environment 220 may provide segregated (e.g., separate and/or isolated) memory space from the workspace 216 of the host computer system 212. For example, the sandboxed computing environment 220 may be enforced using a sandbox container process. The sandbox container process may segregate the workspace 216 from the sandboxed computing environment 220. The first memory space (e.g., the workspace memory) may enable storage and/or operation of the workspace 216. The operating system 226 may enable operation of the sandboxed computing environment 220. The second memory space may enable storage and/or operation of one or more applications and/or processes associated with the sandboxed computing environment 220. For example, the second memory space may be reserved for storage and/or operation of the applications and/or processes running within the sandboxed computing environment 220. The sandbox container process may isolate the first memory space and the second memory space. For example, the sandbox container process may enable the internal isolation firewall 218. The internal isolation firewall 218 may enforce a separation of the first and second memory spaces. For example, the internal isolation firewall 218 may allow a predefined set of processes to be executed within the sandboxed computing environment 220. The internal isolation firewall 218 may prevent execution, in the sandboxed computing environment 220, of any processes outside of the predefined set of processes. The second memory space may be referred to as a separate and/or isolated memory space. The sandbox container process may segregate the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory. The first memory space and the second memory space may be enforced via a software partition.

The service provider network 234 may not defend against malware ingress. The service provider network 234 may be configured to prevent lateral movement of malware and/or data exfiltration by the malware. For example, if malware in a sandboxed computing environment 220 is able to access the resources, assets, and/or files of the operating system 226, the host computer system 212 may be considered infected and untrusted. For example, the malware may bypass the internal isolation firewall 218 via explicit user input. The host-based firewall 214 may prohibit the introduced malware from communicating with any other device on the local network 230. For example, the host-based firewall 214 may be configured to block incoming traffic from the local network 230.

Malware may be introduced to the operating system 226 from a source other than communication with the Internet 242. For example, malware may be introduced to the operating system 226 via an infected email, an infected USB memory stick, and/or another infected hardware device.

An infected and/or untrusted host computer system (e.g., regardless of the introduced malware's vector) may have no communication (e.g., direct communication) with the Internet 242. For example, the border firewall 238, the local firewall 232, and/or the proxy device 236 may prevent the infected and/or untrusted host computer system from communicating with the Internet 242. Without a connection to (e.g., communication with) the Internet 242, the introduced malware may be prevented from performing many toolset functions described herein or any other function that an enslaved, infected and/or untrusted host computer system may perform. Without a connection to the Internet 242, the introduced malware may not be able to transfer any data from the infected and/or untrusted host computer system to the Internet 242.

The host computer system 212, the local network 230, and/or the service provider network 234 may limit the adverse effects associated with a received malware. For example, the host computer system 212, the local network 230, and/or the service provider network 234 may prevent the received malware from using its vector to communicate data from the host computer system 212.

An author of the malware may not be aware of any level of efficacy of the introduced malware and/or its successful attack vector. The host computer system 212 and/or the local network 230 may prevent data of an infected and/or untrusted host computer system that may have been compromised and/or collected by the malware from being communicated to the author of the malware. For example, the host computer system 212 may prevent communication between an infected and/or untrusted host computer system and the Internet 242 (e.g., the author of the malware via the Internet 242).

A device with a sandbox-based network isolation system may travel between, connect to, and/or communicate with more than one network environment. For example, a device with a sandbox based network isolation system may travel between, connect to, and/or communicate with one or more of a local network, a LAN, a WAN, a WWAN, a cellular network, a digital subscriber line (DSL) network, a Wi-Fi network, a LPWA network, a satellite network, an infrastructure as a service (IaaS) network, a platform as a service (PaaS) network, and/or the like. The device may be configured to provide network isolation by using a host-based firewall, an internal isolation firewall, and/or a segregation of memory space. The host-based firewall may enable network isolation of the device across different network environments. For example, the host-based firewall may prevent communications from other devices in the different network environments. The device may access the service provider network via one or more of the network environments.

The host-based firewall may be configured to determine whether the host computer system is connected to a trusted network or an untrusted network. A local network may be a trusted network. Examples of an untrusted network may include another local network, a public Wi-Fi network, a cellular network, a satellite network, and/or the like. The host-based firewall may implement a first configuration when the host computer system is connected to the trusted network. The host-based firewall may implement a second configuration when the host computer system is connected to the untrusted network. The second configuration of the host-based firewall may prevent unauthorized communications between a first set of one or more applications and/or processes and one or more untrusted network destinations. The second configuration of the host-based firewall may allow at least a browser process to communicate with the untrusted resources. The first configuration of the host-based firewall may allow the first set of one or more applications and/or processes to send one or more communications directly to one or more network destinations on the trusted network, for example, without requiring the first set of one or more applications and/or processes to utilize a predetermined set of communication protocols.

The second configuration implemented by the host-based firewall may allow one or more of the first set of applications and/or processes to communicate with a trusted network destination using a predetermined set of communication protocols. The predetermined set of communication protocols may include communicating with the trusted network destination via a Virtual Private Network (VPN) client associated with the workspace. The trusted network destination may be located on a trusted network. The VPN client may be configured to establish an encrypted communication system with the trusted network destination via the untrusted network. The second configuration of the host-based firewall may allow one or more of the first set of one or more applications and/or processes to access the trusted network via the untrusted network and/or the Internet using the VPN client. The VPN client may be configured to enable access to the trusted network via the untrusted network and/or the Internet.

A device having sensitive, private, and/or security data may include a sandbox-based network isolation system. A device having access to sensitive, private, and/or security data may include a sandbox-based network isolation system. The sandbox-based network isolation system may be configured to prevent access by unauthorized devices to the sensitive, private, and/or security data. For example, the sensitive, private, and/or security data may be stored in a first memory space of the host computer system. The host computer system may enable communication with untrusted network destinations via a second memory space. The host computer system may enforce segregation of the first memory space and the second memory space. For example, any malware introduced to the second memory space from communication with the untrusted network destinations may be prevented from accessing the first memory space. The segregation of the first memory space and the second memory space may be software-based and/or hardware-based. For example, the first memory space may be enabled by a first hard drive and the second memory space may be enabled by a second hard drive. As another example, the first memory space and the second memory space may be enabled by a single hard drive. The first memory space and the second memory space may be associated with one or more partitions in the single hard drive. An internal isolation firewall, as described herein, may enforce the segregation of the first memory space and the second memory space.

A sandbox-based network isolation system may be used to prevent malware from establishing command and control on a computer system (e.g., a desktop computer, a laptop computer, a tablet, a mobile phone, etc.). For example, the sandbox-based network isolation system may be configured to operate on a computer system running Windows, Linux, MacOS, iOS, Android, Windows Mobile, and/or some other operating system.

A sandbox-based network isolation system may prevent malware from moving from a first computer system to a second computer system on the same network environment. For example, when a computer system in a network environment is infected with malware, the sandbox-based network isolation system may prevent proliferation of the malware within the network environment.

A sandbox-based network isolation system may increase the security posture of a local network (e.g., a WAN, a LAN, and/or a VM infrastructure). For example, the sandbox-based network isolation system may protect the local network from malware, command and control attacks, viruses, and/or data exfiltration attacks.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:
1. A service provider network comprising one or more network devices, wherein the service provider network is configured to:
   determine network isolation configuration information for a client device on a local area network (LAN), the client device associated with a client account, wherein the network isolation configuration information comprises an identification of an untrusted network destination for the client device;
   send the network isolation configuration information to the client device;
   receive client credentials to be used to authenticate a segregated untrusted memory space of the client device, wherein the client credentials indicate an amount of security protection to be provided based on a user and a predefined configuration set;
   authenticate a segregated untrusted memory space of the client device using the client credentials, wherein the segregated untrusted memory space of the client device is isolated from a trusted memory space of the client device by an internal isolation firewall;
   receive, from a first application or process operating in the authenticated segregated untrusted memory space of the client device, a first request to communicate with the untrusted network destination; and allow, based on the network isolation configuration information and on the authentication of the segregated untrusted memory space, the first application or process operating in the authenticated segregated untrusted memory space to communicate with the untrusted network destination.

2. The service provider network of claim 1, wherein the untrusted network destination is a first untrusted network destination and the service provider network is further configured to:
receive, from a second application or process operating on a workspace of the client device, a second request to communicate with a second untrusted network destination, wherein the workspace is isolated from the authenticated segregated untrusted memory space; and
prevent the second application or process operating on the workspace of the client device from communicating with the second untrusted network destination based on the second request being from outside the authenticated segregated untrusted memory space.

3. The service provider network of claim 1, further comprising a firewall configured to block one or more of ports, protocols, or traffic between unauthenticated devices on the LAN and the untrusted network destination.

4. The service provider network of claim 1, wherein the LAN comprises a plurality of client devices associated with the client account, the service provider network further configured to:
implement a client portal associated with the client account; and
provide, via the client portal, a client portal interface accessible by at least one of the plurality of client devices associated with the client account.

5. The service provider network of claim 4, wherein the client portal interface is configured to enable modification of the network isolation configuration information by the at least one of the plurality of client devices associated with the client account.

6. The service provider network of claim 4, further configured to
push, via the client portal to the plurality of client devices, one or more of a patch, an update, or a security control.

7. The service provider network of claim 1, further configured to implement, on the client device, a local firewall configured to prevent communications between the client device and other devices on the LAN.

8. The service provider network of claim 1, wherein the client device is a first client device, wherein the segregated untrusted memory space is a first segregated untrusted memory space, and wherein the service provider network is further configured to authenticate a second segregated untrusted memory space operating on a second client device on the LAN, wherein the network isolation configuration information further comprises one or more of a whitelist that comprises a trusted network destination and a blacklist that comprises the untrusted network destination.

9. The service provider network of claim 1, wherein the network isolation configuration information further comprises an identification of a trusted network destination, and the service provider network is further configured to:
receive, from a second application or process operating on a workspace of the client device, a second request to communicate with a network destination, wherein the workspace is isolated from the authenticated segregated untrusted memory space;
determine, based on the network isolation configuration information, that the network destination is the trusted network destination; and
allow the second application or process operating on the workspace of the client device to communicate with the trusted network destination.

10. The service provider network of claim 1, further configured to:
manage, using a server, the network isolation configuration information; and
proxy communications, using a proxy device, between the authenticated segregated untrusted memory space and the untrusted network destination.

11. The service provider network of claim 1, wherein the segregated untrusted memory space comprises a sandboxed computing environment enforced by a sandbox container process that enables the internal isolation firewall.

12. The service provider network of claim 1, further configured to receive, from the client device, a request for the network isolation configuration information.

13. A host computer system comprising:
a memory; and
a processor configured to:
connect to a local area network (LAN);
communicate with a network destination via an Internet service provider (ISP);
receive, from the ISP, network isolation configuration information comprising an identification of an untrusted network destination for the host computer system;
implement a segregated untrusted memory space that is configured to enable operation of a set of one or more applications or processes, wherein the segregated untrusted memory space is isolated from a trusted memory space operating on a workspace of the host computer system by an internal isolation firewall;
send client credentials to be used to authenticate a segregated untrusted memory space of the host computer system, wherein the client credentials indicate an amount of security protection to be provided based on a user and a predefined configuration set;
authenticate the segregated untrusted memory space of the host computer system with the ISP using the client credentials;
communicate, using the set of one or more applications or processes operating on the segregated untrusted memory space with the untrusted network destinations via the ISP; and
implement a local firewall that is configured to prevent communications between the host computer system and other computer systems connected to the LAN.

14. The host computer system of claim 13, wherein the segregated untrusted memory space comprises a sandboxed computing environment that is enforced by a sandbox container process that enables the internal isolation firewall, and wherein the processor is configured to operate the workspace that is enabled by and executed using the trusted memory space that is isolated from the segregated untrusted memory space by the sandbox container process.

15. The host computer system of claim 14, wherein the processor is further configured to:
send, from an application or process operating on the workspace to the ISP, a request to communicate with a network destination; and
on a condition that the network destination is identified as a trusted network destination in the network isolation configuration information, communicate with the network destination via the workspace and the ISP.

16. The host computer system of claim 13, wherein the host computer system is associated with a client account, and wherein the processor is further configured to:
communicate with a client portal via a client portal interface associated with the client account; and
modify, via the client portal interface, the network isolation configuration information.

17. The host computer system of claim 16, wherein the processor is further configured to receive, via the client portal, one or more of patches, updates, or security controls associated with the client account.

18. The host computer system of claim 13, further configured to send, to the ISP, a request for the network isolation configuration information.

* * * * *